May 12, 1970          N. GOLD          3,511,566

PHOTOGRAPHIC EXPOSURE AND PROCESSING APPARATUS

Filed April 12, 1968          2 Sheets-Sheet 1

INVENTOR
Nicholas Gold
BY Brown and Mikulka
and
Alfred E. Corrigan
ATTORNEYS

INVENTOR
Nicholas Gold
BY Brown and Mikulka
and
Alfred E. Corrigan
ATTORNEYS

United States Patent Office 3,511,566
Patented May 12, 1970

3,511,566
PHOTOGRAPHIC EXPOSURE AND PROCESSING APPARATUS
Nicholas Gold, Arlington, Mass., assignor to Polaroid Corporation, Cambridge, Mass., a corporation of Delaware
Filed Apr. 12, 1968, Ser. No. 720,771
Int. Cl. G03b 27/32, 27/70
U.S. Cl. 355—67                                                                                  8 Claims

ABSTRACT OF THE DISCLOSURE

An exposure system including an exposure chamber having a support forming one end of the chamber for positioning graphic material for exposure, a light source for directly illuminating the support, reflectors for reflecting light from the light source toward the support, and deflectors for deflecting direct light onto the support for increasing the intensity of the light incident upon the support outwardly from the center thereof.

---

This invention relates to photographic apparatus for exposing and processing successive areas of a photosensitive image-recording sheet to produce visible images in said sheet and more particularly to apparatus useful for copying documents.

Photographic apparatus of the type comprehended by the present invention generally includes means for exposing successive areas of a light-sensitive, image-recording sheet to light from a subject, such as a document, page of a book, photograph, etc., cutting the exposed, image-recording sheet into sections each including an exposed area; and treating each of the sections with a liquid processing agent to form a visible (positive) image of the subject. The exposure system of the apparatus generally comprises means for supporting successive sections of the photosensitive sheet in position for exposure, means for locating a subject in position for exposure, means for illuminating the subject, and an optical system including an objective lens for producing an image of the subject on the section of the photosensitive sheet positioned for exposure. The processing system includes means for severing each exposed section of the photosensitive sheet from the remainder of the sheet and applying a liquid processing agent to the exposed area of each section to effect visible image formation.

An object of the invention is to provide, in photographic apparatus of the type described including means for supporting an original in position for exposure and a source of light for exposing the original, novel and improved means for increasing the intensity of the light incident upon the original outwardly from the center thereof.

Another object of the invention is to provide, in apparatus as described including support means for positioning graphic material for exposure and a source of light, means for reflecting light towards an opposite portion of the support while simultaneously substantially preventing any light from directly falling on an adjacent portion of the support means.

Another object of the invention is to provide, in apparatus as described including support means in the form of a window for positioning graphic material for exposure and a source of light for exposing the photographic material, means for preventing light emitted by the above-mentioned source from being reflected directly by the window to the lens of the apparatus.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 1:
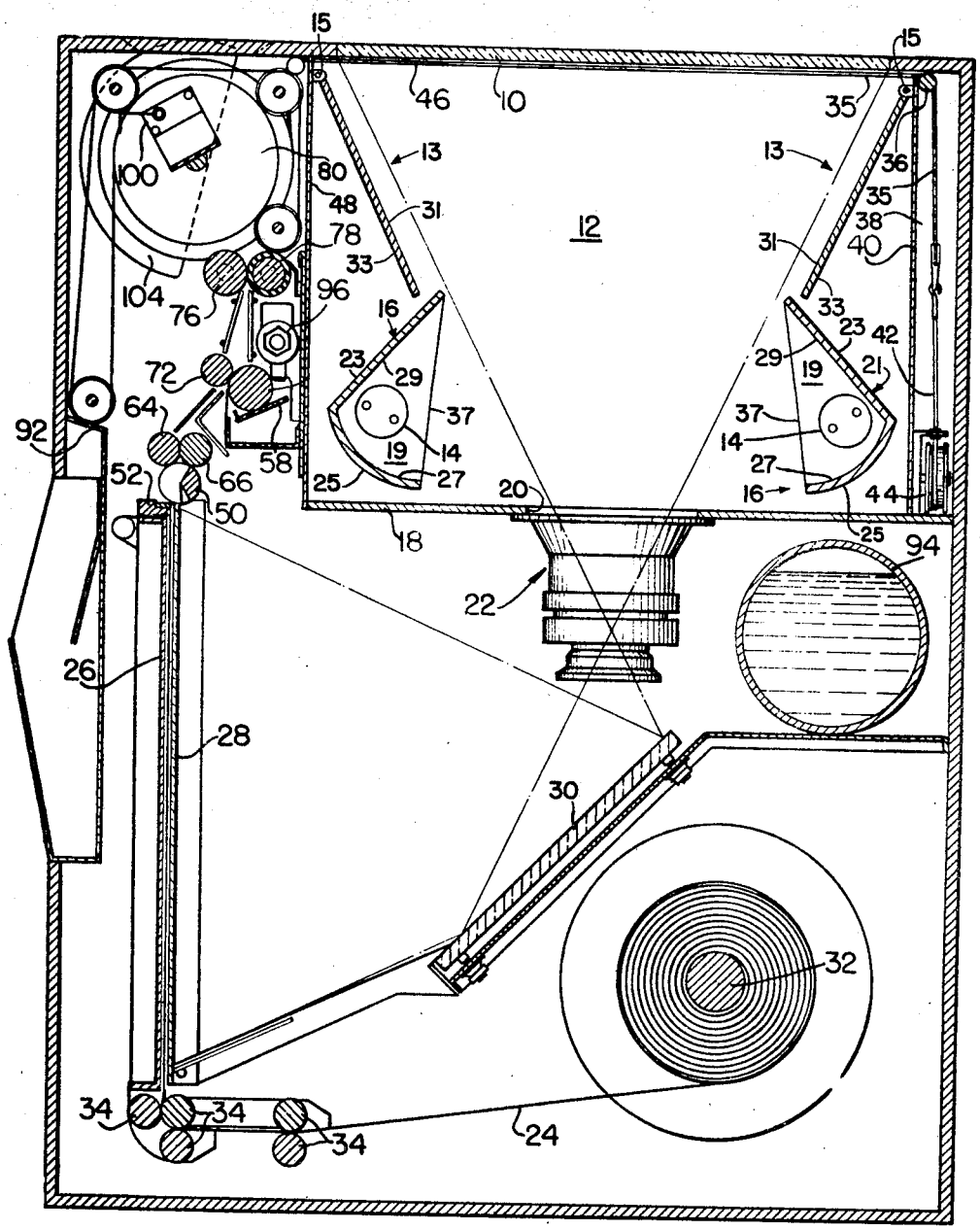
Figure 2:
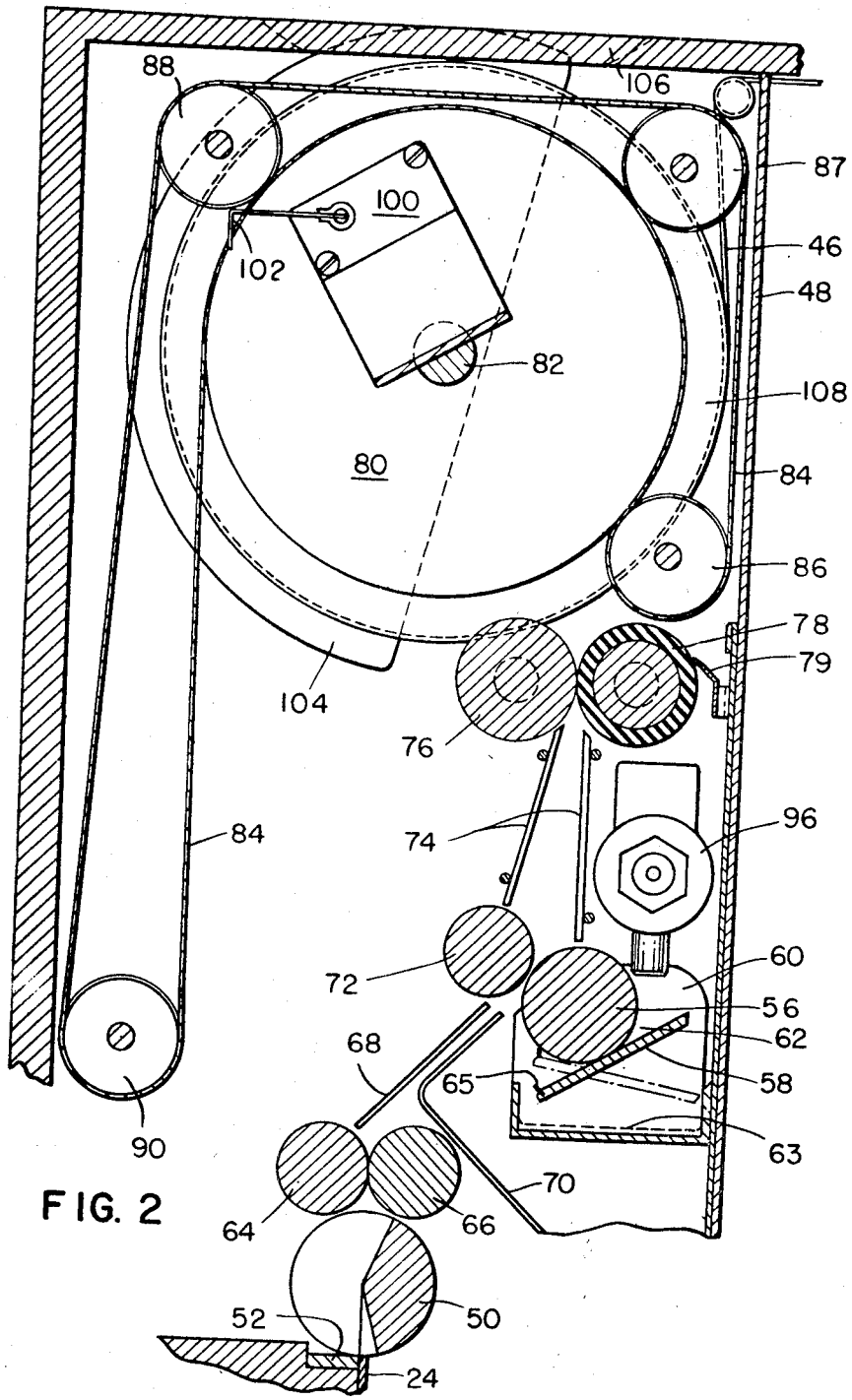

For a fuller understanding of the nature and objects of the invention, reference should be had to the following detailed description taken in connection with the accompanying drawings wherein:

FIG. 1 is a sectional, elevational view of photographic document copying apparatus embodying the invention; and FIG. 2 is an enlarged sectional view of a portion of the apparatus illustrating the construction of the processing means.

The document copying apparatus embodying the instant invention is shown in FIG. 1 as including an exposure system comprising a generally horizontal, transparent window 10 comprising one end wall of a chamber 12 in which are mounted lamps 14 and baffle means 16 for illuminating an original document positioned for exposure on the upper surface of window 10. The chamber is defined by walls comprising the housing of the apparatus including a lower wall 18 located towards the other end of chamber 12 and provided with a centrally located opening 20 in which is mounted an objective lens and shutter assembly 22 of a conventional type employed in photography and side walls 40, 48 which define opposite sides of chamber 12. The apparatus is primarily intended to photograph rectangular subjects and accordingly, window 10 is rectangular in shape having length and width dimensions at least equal to those of the largest document, e.g., 8½ x 14 inches, usually reproduced.

Means are provided for supporting successive areas of a light-sensitive, image-recording sheet designated 24, in position for exposure to light from an original, positioned on window 10, transmitted by lens 22. These means include a generally planar support plate 26 mounted with a surface thereof in a vertical plane facing lens 22 and a transparent plate 28 located in juxtaposition with the surface of the support plate for holding successive sections of the image-recording sheet against the support plate. In lieu of transparent plate 28, a frame may be provided for engaging the section of the sheet to be exposed at the margins of the section for supporting it against plate 26. Mirror 30 is arranged substantially at a 45° angle with respect to the axis of lens 22 and the plane of support plate 26 for redirecting light from the lens toward the support plate and a section of the photosensitive sheet positioned thereon, and producing the geometric image reversal required for a correct copy of the original. Photosensitive sheet 24 is supplied coiled upon a spool 32 mounted beneath mirror 30 and is advanced from the spool upwardly between the support and transparent plates by a succession of driven feed rolls designated 34.

In photographic apparatus of the foregoing type, it has been found that a certain amount of vignetting occurs along the outer edges of the section of photosensitive sheet 24, positioned between plates 26, 28 when the material supported by window 10 is exposed. This vignetting or darkening, is due in part to the fact that a light ray emanating from lamp 14 and directed towards an opposite end of an original positioned for exposure on window 10, must travel further than one directed at a center portion of the original or document, thereby having less energy (ability to photographically expose the original) than the wave directed toward the center portion. In other words, the intensity of the light incident upon window 10 by lamps 14 diminishes as you move from the center of window 10 outwardly towards the ends thereof. Needless to say, this vignetting is undesirable in that it reduces the effective area of the sheet positioned between plates 26, 28 which is available for reproducing the image of the object placed on window 10. The instant invention provides a structure for obviating the above-mentioned problem in a simple and inexpensive manner.

The structure for obviating the vignetting problem is clearly shown in FIG. 1 and is comprised of two baffle means 16 having a longitudinal dimension substantially equal to the width of chamber 12, i.e., they run substantially the length of walls 40, 48, and a pair of generally planar deflectors 13 pivotally mounted at 15 to the side walls 40, 48 of chamber 12. Each of the baffle means 16 is comprised of a pair of end plates 19 which are connected by generally C-shaped members 21. Members 21 include a baffle portion 23 which substantially prevent any light emanating from its associated lamp 14 from directly striking the major portion of window 10 which is located at the same side of the chamber 12, and a curved surface 25 having a generally parabolic configuration in cross section. The interior surfaces 27 of members 21 have a spectral or mirror-like finish in contrast with surfaces 29 which have an absorptive finish, e.g., flat black paint. Surfaces 31 of deflectors 13 are provided with a diffusingly reflective surface. Baffle portion 23, in addition to substantially preventing any light emanating from its associated light source from directly striking an adjacent side or portion of window 10, also prevents any light from its associated light-producing means from being reflected directly by the window 10 to the lens in assembly 22. In order to reduce specular reflections, the exterior surfaces of the baffle means 16, the surfaces 33 of deflectors 13, end plates 19 and the interior side walls and lower wall 18 of chamber 12 all have a substantially absorptive or nonreflective type finish thereon, e.g., a flat black paint.

As can be seen in FIG. 1, light emanating from a lamp 14 is reflected by the reflector surface 27 of its associated baffle means 16 and is deflected by the baffle portion 23 towards an opposite side of window 10, i.e., light emanating from the lamp 14 positioned at the left hand side (as viewed in FIG. 1) of chamber 12 is reflected and directed towards the opposite or right hand side of window 10. Also, some of the light emanating from lamp 14 is reflected by surface 31 of deflector 13 and redirected towards the adjacent portion of window 10. This redirected light adds to the intensity of the light incident upon window 10 such that the intensity of the light incident upon the window increases outwardly from the center of window 10. The pivotal connection 15 provides a means whereby the angle which the deflectors 13 make with respect to the plane of window 10 may be changed to vary the rate at which the intensity of the light incident upon the window changes. It has been found that an angle of 63½°, as measured between the deflector 13 and window 10, will provide the required change in intensity incident upon window 10 when the angle between a plane parallel with the axis of lens 22 and a plane containing the free ends 37 of end members 19 is approximately 6½°. Although chamber 12 is shown as being provided with two fluorescent lamps 14, it is within the scope of the invention to have a single fluorescent tube mounted adjacent wall 18 and extending substantially around the periphery of chamber 12; or, the fluorescent tube may be replaced by a plurality of incandescent lamps, e.g., one placed at each corner of chamber 12 adjacent wall 18.

In a document copier designed to produce copies having a one-to-one size correspondence with the original, window 10 is at least substantially coextensive in size and shape with transparent plate 28 so that during each exposure, the entire area of the section of the photo-sensitive sheet located behind transparent plate 28 on support plate 26, is exposed to light reflected from objects, such as a cover, located outside of window 10. It is frequently desirable to produce copies of originals that are substantially smaller than window 10 and transparent plate 28 and this practice would normally result in exposure of the entire area of the sheet located behind plate 28 and substantial waste of the photosensitive sheet material. Provision is made in the document copier of the invention for varying the length of the area of the photosensitive sheet exposed in order to conform more approximately with the length of the original being copied, and thereby reduce wastage of the photosensitive sheet material. The means for controlling the length of the exposed photosensitive sheet comprise a curtain 35 movable across the underside of window 10 within chamber 12 for obscuring a portion of the window and preventing exposure of the photosensitive sheet by light entering that portion of the window. Curtain 35 is mounted for movement over a support roll 36 mounted in the upper portion of a chamber 38 located at one end of chamber 12 and separated therefrom by side wall 40, with the end portions of the curtain disposed within chambers 12 and 38 on opposite sides of support roll 36. The edge of curtain 35 within chamber 12 is substantially straight, is perpendicular to the direction of movement of the photosensitive sheet, and defines the end of the area of the photosensitive sheet that is exposed.

Curtain 35 is supported and moved by providing flexible cables attached to the opposite ends of the curtain. The end of the curtain within chamber 38 is attached to a cable 42, in turn, coupled with a drum 44, biased for rotation by a torsion spring tending to wind the cable about the drum and draw the curtain into chamber 38. Two cables 46 are coupled with the opposite end of the curtain at the lateral edges thereof and extend across chamber 12 closely adjacent the underside of window 10 through openings in side wall 48 of the chamber where cables 46 are coupled with means for moving the cables to adjust the position of curtain 35.

Following exposure, the exposed section of sheet 24 located between plates 26 and 28 is advanced upwardly between a rotary knife 50 and anvil 52, into the processing section of the apparatus while another section of the photosensitive sheet is advanced upwardly between the two plates into position for exposure. When the exposed section of the photosensitive sheet has passed between the knife and anvil, the knife is rotated to sever this section of the sheet from the remainder of the photosensitive sheet located between the plates and movement of the photosensitive sheet by feed rolls 34 is discontinued. The severed section of the photosensitive sheet continues through the processing section of the apparatus where it is treated with a liquid preferably to produce a visible image.

In the processing section of the apparatus, a liquid processing composition is applied to one side of the exposed photosensitive sheet for permeation into the sheet to effect the formation of a visible image. The means for applying the processing liquid may take a number of different forms such as shown, for example, in U.S. Pat. No. 3,330,196; or it may take the form shown in detail in FIG. 2 of the drawings. The processing system shown and described herein is designed to apply a predetermined quantity of a non-viscous liquid to the exposed side of the photosensitive sheet, preferably to effect image formation by a silver halide diffusion transfer process. For examples of such processes and the materials useful therein, reference may be had to copending U.S. applications Ser. No. 519,995 of Edwin H. Land, and Ser. No. 519,884 of Edwin H. Land et al., both filed Jan. 1, 1966. These applications describe a combination image-recording and image-receiving sheet comprising a support such as paper, at least one layer containing a light-sensitive material such as a silver halide emulsion, and an outer layer comprising a translucent material such as finely divided titanium dioxide dispersed in a suitable, permeable, colloidal carrier or matrix such as gelatin which is permeable to an aqueous processing liquid. The translucent pigment may be incorporated in the layer containing the light-sensitive material and/or may comprise a separate outer layer which may also contain silver precipitating nuclei and is sufficiently transparent to permit exposure of the light-sensitive layer therebeneath, while at the same time, being sufficiently opaque to provide the requisite background for a positive silver image transferred thereto by diffusion and to mask a negative image formed thereunder. Processing of the exposed image-recording sheet is accomplished by applying an aqueous liquid including a silver halide complexing agent to the side of the sheet opposite the support so as to impregnate the light-sensitive layer with sufficient processing liquid to produce a positive silver transfer image on the surface of the translucent layer.

The processing liquid may be non-viscous, i.e., have the viscosity of water, or it may include a film forming agent and range in viscosity from that of water to a viscosity of 200,000 centipoises at 20° C. The operation and construction of the liquid applicator will depend to a large extent upon the nature and viscosity of the liquid, but in any event, will be designed to apply the processing liquid to at least the exposed (rectangular) area of each section of the photosensitive sheet as the section is advanced through the processing section of the apparatus.

The means shown in this application for applying a non-viscous processing liquid to the sheet include a cylindrical applicator roll 56 mounted for rotation about a substantially horizontal axis, a plate 58 mounted intermediate its lateral edges beneath the applicator roll for pivotable movement about an axis substantially parallel with the axis of rotation of the applicator roll, and a pair of end members 60 for engaging the roll at the ends of the cylindrical portion thereof. Plate 58, in the operative position shown in FIGS. 1 and 2, is disposed with its upper surface tangent with the peripheral surface of the roll and cooperates therewith and with end members 60 to form a trough 62 into which may be introduced a predetermined quantity of processing liquid sufficient to treat a predetermined length of the photosensitive sheet.

Excess liquid may be disposed of and the applicator roll cleaned by pivoting plate 58 to the inoperative position shown in broken lines in FIG. 2 to dump the excess liquid into a container 63 provided beneath the plate for this purpose. A scraper blade 65 is mounted along one edge of plate 58 for engaging and removing residual liquid from the applicator roll. The liquid deposited in trough 62 is applied to a sheet by rotating roll 56 (in a counterclockwise direction, as viewed in FIG. 2) to apply the liquid as a thin layer to the peripheral surface of the roll and advancing the sheet relative to and past the roll in the opposite direction in contact with the peripheral surface of the roll to transfer the liquid from the roll to the sheet. A pair of juxtaposed feed rolls 64 and 66 mounted above knife 50 are provided for advancing each section of the photosensitive sheet from between the knife and anvil upwardly toward the applicator roll, and guides 68 and 70 are provided on opposite sides of the path of movement of the sheet between the feed rolls for guiding the sheet along a path tangent with the portion of the peripheral surface of applicator roll 56 lying opposite trough 62. A backing roll 72 is provided mounted in juxtaposition with applicator roll 56 for guiding and supporting the sheet against the applicator roll together with means for rotating roll 72 for advancing the sheet upwardly against the applicator roll.

From the applicator roll the sheet being treated is moved upwardly between guides 74 into the nip of a pair of rolls 76 and 78 which serve to advance the sheet upwardly and, as described in the aforementioned U.S. Pat. No. 3,330,196, function as a wringer to remove excess processing liquid from the surface of the sheet. A scraper blade 79 is mounted in engagement with roll 78 for removing processing liquid therefrom. Processing of the sheet requires that the sheet remain in a dark environment during a processing period of predetermined duration, and for this purpose, the apparatus includes means defining a path of predetermined length along which each sheet is advanced from between rolls 76 and 78 within the apparatus at a speed calculated to provide the necessary processing period. These means comprise a plurality of circular discs 80 mounted for rotation in spaced axial relation on a shaft 82, and a plurality of endless belts 84, each including a portion engaged around a portion of the periphery of one of discs 80, and a return portion supported on pulleys 86, 87, 88 and 90. A sheet 24 is advanced by rolls 76 and 78 upwardly into the nip between discs 80 and belts 84 at pulleys 86 and is advanced along a cylindrical path defined by the peripheries of discs 80 from pulleys 86 past pulleys 88 to the point at which belts 84 are tangent with the discs. The belts are advanced to rotate discs 80 in a counterclockwise direction and move the sheet gripped between the discs and belts along a circular path of about 230° around the peripheries of the discs and thence downwardly from engagement with the discs and through an opening 92 in the housing located beneath and adjacent pulleys 90, the sheets having a tendency to adhere to the belts until the belts are guided around pulleys 90. A plurality of narrow belts and discs are preferred to a single belt and drum in order to limit the area of contact between the sheet and the belts and thereby facilitate drying of the sheet and separation of the sheet from the belts.

The length of each area of sheet 24 processed should be approximately coextensive with the area exposed, and is controlled by cutting each section of the photosensitive sheet to the same length as the uncovered area of window 10, to effect a saving in the sheet material employed. The processing liquid may be supplied in a container 94 mounted in the apparatus adjacent lens 22 above mirror 30 and is dispensed in controlled quantities by a solenoid actuated valve 96 located above trough 62 and coupled by a conduit with container 94. The length of each section of sheet 24 is determined by the length of the sheet permitted to advance between knife 50 and anvil 52 prior to actuation of the knife to sever the sheet.

Knife 50 is preferably electrically controlled, e.g., by means such as a solenoid or relay, in turn controlled by a microswitch 100 mounted on shaft 82 between a pair of discs 80. Switch 100 includes an actuating lever 102 extending into the path of movement of sheet 24 (supported against the peripheries of the discs) in position to be engaged by the leading edge of each section of the sheet for closing the switch and actuating the knife. It will be seen that the length of each section of the photosensitive sheet is the length of the path of movement of the sheet from the knife and anvil to lever 102 and this can be varied by changing the position of the switch by rotating shaft 82 on which the switch is mounted. A sector shaped disc 104 is affixed to shaft 82 and extends through an opening 106 in the upper wall of the apparatus so as to be engageable manually for simultaneously controlling the position of the switch and the position of curtain 35. Cables 46 are coupled with pulleys 108 keyed to shaft 82 so that the length of each severed section of the sheet will correspond with the length of the exposed area thereof. Disc 104 may be calibrated with visible indicia representing positions of the disc for various lengths of copies to be produced. Alternatively, a timer may be coupled directly with shaft 82 by suitable means rather than directly with the curtain via cables 46.

It will be seen that the invention provides a simple and reliable exposure system for providing the correct amount of illumination incident upon the window supporting the original for exposure, ie., by non-uniformly illuminating the object plane, the image plane is provided with a uniform illumination.

Although plates 13 have been disclosed as a means of deflecting the light onto the bottom surface of window 10, it is within the scope of the invention to replace the plates with a structure wherein the upper portion of each of the side walls 40, 48 would be provided with a diffusing reflective surface and the portions would converge downwardly, as viewed in FIG. 1, thereby providing the desired deflecting surfaces.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus for exposing a photosensitive medium supported at a surface in position for exposure, in combination:
   a chamber including support means forming one end of said chamber for positioning graphic material for exposure;
   image-forming means located towards the opposite end of said chamber for producing an image of said graphic material on a photosensitive recording medium supported for exposure at a position remote from said image-forming means;
   at least two light-producing means positioned between said support means and said image-forming means near opposite sides of said chamber for directly illuminating said support means;
   baffle means having reflective surfaces disposed adjacent each of said light-producing means, said baffle means each including a first part having a reflective surface shaped to reflect light within said chamber from one of said light-producing means onto the opposite side of said chamber and the portion of said support means located closest said opposite side and a second part for substantially preventing light from falling on an adjacent portion of said support means; and
   deflector means mounted near said opposite sides of said chamber, said deflector means having a diffuse surface for deflecting light onto an adjacent portion of said support means for increasing the intensity of said light incident upon said support means outwardly from the ceenter of said support means.

2. Photographic apparatus as defined in claim 1 wherein said deflector means comprise at least two panels, each panel being mounted adjacent an opposite side of said chamber for deflecting light from said light-producing means to an adjacent side of said support means and means for varying the rate of change of increasing light intensity incident upon said support means outwardly from the center thereof.

3. Photographic apparatus as defined in claim 2 wherein said first part of said baffle means, in cross section, is substantially in the form of a parabola.

4. In photographic apparatus for exposing a photosensitive medium supported at a surface in position for exposure, in combination:
   a chamber including support means forming one end of said chamber for positioning graphic material for exposure;
   image-forming means located towards the opposite end of said chamber for producing an image of said graphic material on a photosensitive recording medium supported for exposure at a position remote from said image-forming means.
   at least two light-producing means positioned between said support means and said image forming means near opposite sides of said chamber for directly illuminating said support means;
   baffle means having reflective surfaces disposed adjacent each of said light-producing means, said baffle means each including a first part having a reflective surface shaped, in cross section, in substantially the form of a parabola, to reflect light within said chamber from one of said light-producing means toward the opposite side of said chamber and the portion of said support means located closest said opposite side and a second part for substantially preventing light from falling on an adjacent portion of said support means; and
   at least two diffusingly reflective panels, each panel being mounted near said opposite sides of said chamber for deflecting light onto an adjacent portion of said support means for increasing the intensity of said light incident upon said support means outwardly from the center of said support means.

5. In photographic apparatus for exposing a photosensitive medium supported at a surface in position for exposure, in combination:
   a chamber including support means forming one end of said chamber for positioning graphic material for exposure;
   image-forming means located towards the opposite end of said chamber for producing an image of said graphic material on a photosensitive recording medium supported for exposure at a position remote from said image-forming means;
   at least two light-producing means positioned between said support means and said image-forming means near opposite sides of said chamber;
   baffle means having reflective surfaces disposed adjacent each of said light-producing means, said baffle means each including a first part having a reflective surface shaped to reflect light within said chamber from one of said light-producing means toward the opposite side of said chamber and the portion of said support means located closest said opposite side and a second part for substantially preventing light from falling on an adjacent portion of said support means;
   at least two panels, each panel being mounted near said opposite sides of said chamber for deflecting light from said light-producing means onto an adjacent portion of said support means for increasing the intensity of said light incident upon said support means outwardly from the center of said support means; and
   means for adjustably mounting said panels for varying the rate of change of increasing light intensity incident upon said support means outwardly from the center thereof.

6. Photographic apparatus as defined in claim 1 wherein said light-producing means include at least sources of light positioned near said opposite sides of said chamber, said baffle means include at least two baffles, each of said sources of light having one of said baffles disposed adjacent thereto and each said baffle having a first part shaped to reflect light from its associated light source towards an opposite portion of said support means and a second part for substantially preventing light from its associated light source from falling on an adjacent portion of said support means.

7. Photographic apparatus as defined in claim 1 wherein said baffle means is positioned adjacent said light-producing means to prevent light from said light-producing means from being reflected directly from said support means to said image-forming means.

8. Photographic apparatus as defined in claim 1 further including obturator means for varying the area of said support means upon which the light from said light-producing means is incident.

References Cited

UNITED STATES PATENTS

| | | | |
|---|---|---|---|
| 3,272,066 | 9/1966 | Rice | 355—70 |
| 3,382,783 | 5/1968 | Chen | 95—13 |

NORTON ANSHER, Primary Examiner

R. A. WINTERCORN, Assistant Examiner

U.S. Cl. X.R.

355—70; 353—65; 95—13